Jan. 10, 1928.
F. B. FARNSWORTH
1,656,108
AUTOMATIC FEED CONTROL FOR LUBRICATORS
Filed Aug. 28, 1925
2 Sheets-Sheet 1
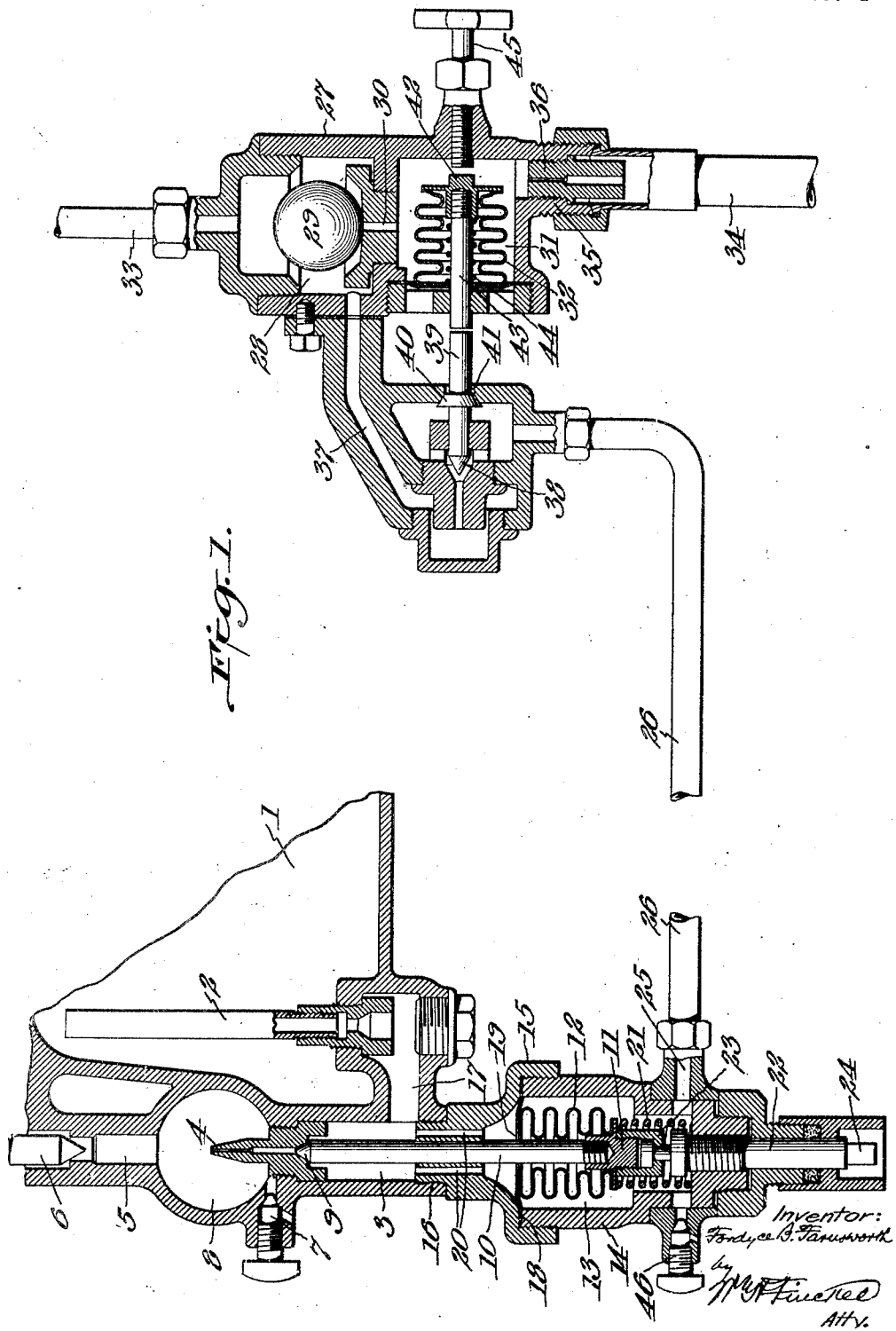

Jan. 10, 1928.
F. B. FARNSWORTH
1,656,108
AUTOMATIC FEED CONTROL FOR LUBRICATORS
Filed Aug. 28, 1925    2 Sheets-Sheet 2
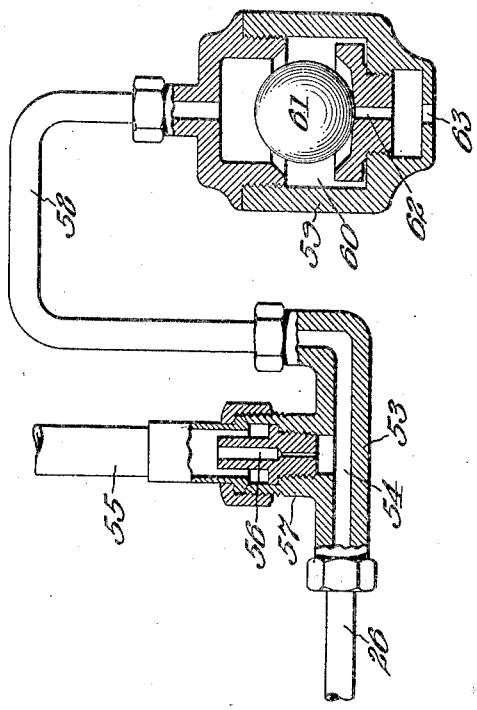
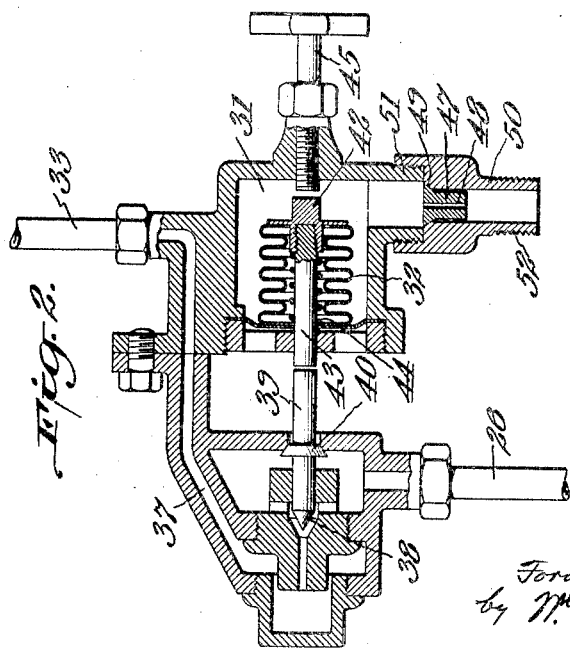
Inventor:
Fordyce B. Farnsworth
Atty.

Patented Jan. 10, 1928.

1,656,108

UNITED STATES PATENT OFFICE.

FORDYCE B. FARNSWORTH, OF WADSWORTH, OHIO, ASSIGNOR TO CHICAGO LUBRICATOR COMPANY, OF CHICAGO, ILLINOIS, A CORPORATION OF ILLINOIS.

AUTOMATIC FEED CONTROL FOR LUBRICATORS.

Application filed August 28, 1925. Serial No. 53,089.

The object of this invention is to provide an automatic feed control for lubricators, of such a nature that lubricant will be supplied from the lubricator to the parts of the machine or apparatus to be lubricated while the machine or apparatus is running, but will cut off the lubricant from such machine or apparatus when the same is idle.

The invention is particularly applicable for automatically supplying lubricant to the moving parts of a locomotive while the locomotive is in motion, whether the locomotive is running under power, or is drifting, and for automatically cutting off such supply of lubricant when the locomotive is standing or idle, thus making it unnecessary for the engineer to manually control the supply of lubricant, and resulting in a material saving of lubricant over the amount ordinarily used where the supply thereof to the parts to be lubricated is manually controlled, owing to the fact that the lubricant is automatically fed from the lubricator only at such times as is necessary.

The invention consists of an automatic feed control for lubricators, including the combination with a lubricator having a valve for controlling the flow of lubricant therefrom, of a pressure-operated device responsive to a change of pressure incident to the operation of the machine to be lubricated, and acting in response to such change in pressure upon means associated with the control valve of the lubricator, to open and close said valve when the machine is running and when it is idle respectively, as I will proceed now to explain and finally claim.

In the accompanying drawings illustrating the invention, in the several figures of which like parts are similarly designated, Figure 1 is a fragmentary section of a portion of the oil bowl and the feed tip of a hydrostatic lubricator of known type, with the devices of my invention applied thereto. Fig. 2 is a sectional elevation illustrating a modified form of the pressure-responsive device. Fig. 3 is a sectional elevation of another modified form of pressure-responsive device.

Referring to Fig. 1, 1 is the oil bowl of the lubricator, to which leads a connection from a source of pressure such as a locomotive boiler (these latter parts being omitted), and this bowl communicates through a riser 2 with a feed chamber 3 from which the lubricant escapes through the feed tip 4 into a passage 5 controlled by a valve 6 past which the lubricant feeds into pipes (not shown) which lead to the parts to be lubricated, in the ordinary manner. The valve 6 is merely for the purpose of regulating the rate of flow of the oil into the feed pipes, and is set at a predetermined opening, at which it is allowed to remain fixed. A drain plug 7 is provided for draining the sight feed chamber 8 when desired.

All of the parts above described are of ordinary approved construction and form no part of this invention, except in their combination and cooperation with the parts hereinafter described.

Instead of the ordinary manually operated valve for controlling communication between the oil bowl 1 and the feed tip 4, I provide an automatically, mechanically operated valve 9 having a stem 10, the lower portion of which is connected by means of a fitting 11 with a pressure responsive means or diaphragm 12 mounted in a chamber 13 formed by a casing 14. This casing has a cap 15 which is secured as at 16 to the feed arm 17 of the oil bowl. The diaphragm 12 is fixed between the casing 14 and its cap 15 by means of a web 18 clamped between these parts, and this web is provided with an opening 19 through which access from the oil bowl to the interior of the diaphragm is had by way of passages 20 formed in the neck of the cap 15.

The valve 9 is normally held closed by a spring 21, and a threaded stem 22 connected to the fitting 11 by means of a sleeve 23 is provided for manually opening and closing the valve 9 when necessary or desirable, the stem 22 having a squared end 24 to which an ordinary key may be applied for the purpose of turning same.

Connected to the chamber 13 through a port 25 and pipe 26 is the pressure-responsive device hereinabove referred to. This pressure-responsive device, in the form shown in Fig. 1, comprises a casing 27 having a chamber 28 in which is mounted a ball valve 29. This ball valve controls communication, through an opening 30, between the chamber 28 and a chamber 31 in which is mounted a pressure responsive means or diaphragm 32. The chamber 28 is in communication with the same source of fluid under pressure as the oil bowl 1, such as the locomotive boiler, through a pipe 33. The chamber 31 is connected to a separate source of pressure, such as the locomotive engine cylinder, through a pipe 34 connected with a nipple 35 in which is arranged a choke plug 36.

Communication between the chamber 28 and the pipe 26, and hence between the locomotive boiler and the chamber 13, is established through a passage 37 controlled by a valve 38. Upon the stem 39 of this valve is mounted a valve disk 40 which controls communication between the chamber 13 and the atmosphere through pipe 26 and an opening 41.

Supported by a fitting 42 carried by the diaphragm 32 and forming a closure for one end thereof, is a rod 43 in axial alignment with the stem 39 of the valve 38. This rod 43 is adapted, upon compression of the diaphragm, as will be hereinafter described, to seat the valve 38 and unseat the valve disk 40.

A spring 44 is arranged to keep the diaphragm normally in expanded position, as shown.

A manually operable screwthreaded rod 45 is provided for manually seating valve 38 and unseating valve disk 40 when desired.

In order that the pipe 26 and chamber 13 and the various compartments and cavities in the apparatus connected therewith may be drained, or may be cleaned by blowing steam or air through same, I provide a drain plug 46.

The operation of this form of the invention is as follows:—Assuming that the oil bowl 1 and the pipe 33 are connected with a locomotive boiler, whereby the same pressure is established in the chamber 28, oil bowl 1, feed member 17 and the interior of the diaphragm 12, and that the locomotive is standing, all of the parts of the device will be in the positions shown in Fig. 1, and boiler pressure will be established within the diaphragm 12, as pointed out, and within the chamber 13 around the outside of the diaphragm 12 through passage 25, pipe 26, passage 37 and chamber 28 past valve 38. The pressures being thus balanced upon both sides of the diaphragm 12, the spring 21 will hold the valve 9 to its seat and will cut off flow of lubricant from the feed chamber 3 to the feed tip 4.

When the engine throttle is opened, and the locomotive is running under power, steam from the engine cylinder, or cylinders will enter the chamber 31 through pipe 34 and choke plug 36. Also, the motion of the locomotive while running will unseat the ball valve 29 and will permit steam under boiler pressure to enter the chamber 31 directly from the pipe 33 through the opening 30. The combined pressures from the locomotive boiler and from the engine cylinders thus established in the chamber 31 will compress the diaphragm 32, thereby forcing the rod 43 to the left and seating the valve 38 and unseating the valve disk 40. This seating of valve 38 and unseating of valve disk 40 cuts off boiler pressure from the chamber 13, and consequently from the outside of diaphragm 12, and allows the pressure formerly established in chamber 13 to exhaust through pipe 26 and opening 41 to the atmosphere. As there is now only atmospheric pressure in the chamber 13 surrounding the outside of the diaphragm 12, no resistance is offered to the expansion of the diaphragm 12 downwardly under the influence of boiler pressure exerted upon the inside thereof, except the resistance offered by the spring 21. The resistance of this spring 21 to the downward movement of the fitting 11 under the influence of the expanding diaphragm is not, however, sufficient to prevent such movement, and, consequently, the valve 9 will be unseated, and oil will feed from the bowl 1 through the riser 2 and chamber 3 and out of the feed tip 4, and thence through the passage 5, past valve 6, to the pipes which lead to the parts to be lubricated.

Supposing now that the locomotive is drifting, that is running with the throttle closed, the same positions of the valves 9 and 38 and valve disk 40 will be maintained as when the throttle is open, for the reason that the ball valve 29 being unseated as before by the vibration of the locomotive, pressure will build up in the chamber 31 through the opening 30, faster than it can exhaust therefrom through the opening in the choke plug 36, which latter opening is of smaller diameter than the opening 30.

When the locomotive comes to a stop, the ball valve 29 will again come to rest and close the opening 30, pressure in chamber 31 will be exhausted through pipe 34, and diaphragm 32 will expand, moving rod 43 to the right and permitting valve 38 to open under boiler pressure acting thereagainst through passage 37, thus again seating valve disk 40 and re-establishing the conditions first described.

In the modification illustrated in Fig. 2, the ball valve 29 is dispensed with, but all of the other parts of the pressure-responsive device are the same as those described in connection with the description of Fig. 1, except that in place of the choke plug 36 used at the connection of the pipe from the engine cylinder to the chamber 31, I substitute a valve 47 having an opening 48 through it. This valve 47 has a seat 49 in a fitting 50 applied to the nipple 51 and threaded at 52 for connection with it of the pipe 34 of Fig. 1.

The operation of this form of the device is as follows:—When the locomotive is standing, the parts will be in the positions shown in Fig. 2 and the valve 9 of Fig. 1 will be closed, as shown.

When the engine throttle of the locomotive is open and the locomotive is running, the pressure in the locomotive engine cylinder will unseat the valve 47 and establish pressure in the chamber 31, and this pressure, acting in the same manner as described in connection with the description of the operation of the form of the invention shown in Fig. 1, will unseat valve disk 40 and seat valve 38, thus permitting valve 9 to open, as previously described.

When the locomotive is drifting, that is running with the engine throttle closed, the compression in the engine cylinder established by the reciprocation of the piston therein, will intermittently raise the valve 47 from its seat 49 and will maintain pressure in chamber 31, to keep valve 38 seated and valve disk 40 unseated, the pressure impulses from the engine cylinder occurring in such rapid succession that the pressure built up thereby in the chamber 31 will be constantly replenished faster than it can escape therefrom through the opening 48 in the valve 47.

When the locomotive comes to a stop, the pressure impulses from the engine cylinder will no longer be present against the valve 47, and the pressure in chamber 31 will be exhausted therefrom through the opening 48 of valve 47. The diaphragm 32 will therefore expand and permit the seating of valve disk 40 and the opening of valve 38 under the influence of boiler pressure in the passage 37.

In the modified form shown in Fig. 3, the connection to the engine cylinder is dispensed with. This form of pressure-responsive device comprises merely a member 53 provided with a bore 54, this bore communicating through pipe 26 with the chamber 13 (Fig. 1), and communicating through a pipe 55 with the locomotive boiler or other source of fluid under pressure. A choke plug 56 is interposed in the connection 57 between the pipe 55 and the bore 54. Also connected with the bore 54 by means of a pipe 58 is a casing 59 providing a chamber 60 in which is mounted a ball valve 61 normally seating over an opening 62 which, when the ball valve is unseated affords communication between the bore 54, and consequently the chamber 13, and the atmosphere, through an opening 63 in the casing 59.

The operation of this form of the invention is as follows:—When the locomotive is standing, the parts are in the position shown, with the ball valve 61 seated over the opening 62. With the parts in this position, boiler pressure enters the bore 54 through pipe 55 and choke plug 56, and being unable to escape through pipe 58 and openings 62 and 63 by reason of the obstruction caused by the ball valve 61, it enters chamber 13 (Fig. 1) through pipe 26, and causes the valve 9 to remain closed, as hereinbefore described.

When the locomotive is running, whether the engine throttle is open or closed, the vibration caused thereby will unseat the ball valve 61, and will allow the steam entering bore 54 through pipe 55 and choke plug 56 to escape through openings 62 and 63 faster than it can enter through the choke plug 56, and also permitting the pressure in chamber 13 to exhaust through pipe 26, bore 54, pipe 58 and openings 62 and 63 and allowing valve 9 to open, in the manner hereinbefore set forth.

When the locomotive comes to a stop, the ball valve 61 will again seat over the opening 62, and pressure will again build up in bore 54, pipe 26 and chamber 13 and valve 9 will again be seated to stop the flow of oil.

I have described the operation of the various forms of my invention in connection with their application to a locomotive, and it is for such service that the invention is primarily adapted, but, obviously, devices embodying the forms of the invention illustrated in Figs. 1 and 3, wherein a ball valve is used, may be applied to and operate efficiently in connection with any piece of machinery or apparatus to be lubricated, which, during its operation, will subject the device of the invention to sufficient vibration to unseat the ball valve.

The form of the invention illustrated in Fig. 2 is applicable not only to locomotives, but to other pressure operated machinery or apparatus where two sources of pressure are available for connection with the passage 37 and oil bowl 2 and the chamber 31.

Obviously, one pressure responsive device, whether of the form shown in Fig. 1 or of the form of the modifications of either Fig. 2 or Fig. 3, may be made to control the valves 9 of a number of feed tips, by providing a number of branch pipes corresponding to the pipe 26 connected with the pressure-responsive device, thereby providing for the simultaneous operation of a plurality of feeds by means of a single pressure responsive device.

It will thus be seen that I provide an automatic feed control for lubricators which will operate efficiently in connection with and which is designed for application to any piece of machinery or apparatus wherein a source of fluid under pressure is available, for supplying lubricant to the parts of such machinery or apparatus to be lubricated while running, and which will automatically shut off such supply when the machine or apparatus is idle.

Various changes are contemplated as within the spirit of the invention and the scope of the followings claims.

What I claim is:—

1. In an automatic feed control for lubricators, the combination with a pressure-operated lubricator having a valve for controlling the flow of lubricant therefrom, of a pressure-responsive device for controlling the opening and closing of said valve, pressure responsive means associated with said valve, and pressure responsive means associated with said pressure-responsive device and operable by variations in pressure in the pressure-responsive device for effecting the opening and closing of said valve through the medium of the pressure responsive means associated with said valve.

2. In an automatic feed control for lubricators, the combination with a pressure-operated lubricator having a valve for controlling the flow of lubricant therefrom, of a pressure-responsive device for controlling the opening and closing of said valve, and a diaphragm associated with said valve and a diaphragm associated with said pressure-responsive device, said diaphragms being responsive to variations in pressure in the pressure-responsive device for effecting the opening and closing of said valve.

3. In an automatic feed control for lubricators, the combination with a pressure-operated lubricator having a valve for controlling the flow of lubricant therefrom, of a pressure-responsive device for controlling the opening and closing of said valve, a diaphragm associated with said valve and subject to the pressure within said lubricator upon one side and to pressure within said pressure-responsive device upon its other side, and means in said pressure-responsive device responsive to variations in pressure therein for varying the pressure upon said diaphragm to effect the opening and closing of said valve.

4. In an automatic feed control for lubricators, the combination with a pressure-operated lubricator having a valve for controlling the flow of lubricant therefrom, of a pressure-responsive device for controlling the opening and closing of said valve, said lubricator and said pressure-responsive device communicating with a common source of fluid under pressure, connections between said pressure-responsive device and a separate source of fluid under pressure, pressure-actuated means associated with said valve and responsive to presure in said lubricator and to pressure in said pressure-responsive device to move said valve in opposite directions to close and open the valve, and means in said pressure-responsive device and responsive to changes in pressure therein due to the two sources of pressure communicating therewith for varying the pressure effect upon said pressure actuated means.

5. In an automatic feed control for lubricators, the combination with a pressure-operated lubricator having a valve for controlling the flow of lubricant therefrom, of a pressure-responsive device for controlling the opening and closing of said valve, said lubricator and said pressure-responsive device being in communication with a common source of fluid under pressure, connections between said pressure-responsive device and an engine cylinder, means associated with said valve and responsive to pressure for seating and unseating the valve, and means in said pressure-responsive device and subject to the combined pressures from the source of fluid under pressure and from the engine cylinder for controlling actuation of said pressure-responsive means.

6. In an automatic feed control for lubricators, the combination with a pressure-operated lubricator having a valve for controlling the flow of lubricant therefrom, of a pressure-responsive device for controlling the opening and closing movements of said valve, said lubricator and said pressure-responsive device being in communication with a common source of fluid under pressure, and said pressure-responsive device being in communication with an engine cylinder, pressure-responsive means associated with said valve and adapted to hold said valve in closed position to arrest the flow of lubricant by a balance of pressures acting upon said means, means affording communication between said pressure-responsive means and said pressure-responsive device, and means in said pressure-responsive device and actuated by the combined pressures from said source of fluid under pressure and from said engine cylinder for overbalancing the pressures upon said pressure-responsive means to induce opening of said valve.

7. In an automatic feed control for lubricators, the combination with a pressure-operated lubricator having a valve for controlling the flow of lubricant therefrom, of a pressure-responsive device for controlling the opening and closing of said valve, said lubricator and said pressure-responsive device communicating with a common source of fluid under pressure, connections between said pressure-responsive device and a separate source of fluid under pressure, a diaphragm associated with said valve and subject upon one side through said lubricator to the pressure from said common source of fluid under pressure, a chamber surrounding said diaphragm, connections between said chamber and said pressure-responsive device and subject to pressure from said common source of fluid under pressure through said pressure-responsive device for subjecting the other side of said diaphragm to the pressure from said common source of fluid under pressure, resilient means acting upon said valve to close the same under the balance of pressure thus established, and means in said pressure-responsive device subject to the combined pressure from the common source of fluid under pressure and said separate source of fluid under pressure for exhausting said chamber and permitting said valve to open under the influence of pressure from the common source of pressure acting upon one side of said diaphragm through said lubricator.

8. In an automatic feed control for lubricators, the combination with a lubricator having a valve for controlling the flow of lubricant therefrom, of a pressure-responsive device for controlling the operation of said valve, means associated with said valve and responsive to pressure exerted in one direction for opening said valve, and connections between said pressure-responsive device and the pressure-responsive means of said valve for effecting control of the pressure acting on said pressure-responsive means in accord with the operation of the pressure-responsive device.

9. In an automatic feed control for lubricators, the combination with a lubricator having a valve for controlling the flow of lubricant therefrom, of a pressure-responsive device for controlling the operation of said valve in response to the operation of the machine to be lubricated, pressure-responsive means associated with said valve, means in said pressure-responsive device and actuated by changes in pressure therein incident to the operation of the machine to be lubricated, and connections between said pressure-responsive means and said pressure-responsive device whereby said valve will be opened when the machine is operating and will be closed when the machine is idle.

10. In an automatic feed control for lubricators, the combination with a lubricator having a valve for controlling the flow of lubricant therefrom to the machine to be lubricated, of a pressure-responsive device for controlling the operation of said valve in response to the operation of said machine, a diaphragm associated with said valve and effective to open and close same under the influence of varying pressures acting thereon, connections between said diaphragm and said pressure-responsive device, and means in said pressure-responsive device and effective under the influence of varying pressures incident to the operation of said machine to vary the pressures acting upon said diaphragm to open said valve when said machine is running and to close it when said machine is idle.

11. A lubricating system for a power unit comprising means for supplying lubricant under pressure, a conduit for conveying the lubricant from the said means to the unit, a pressure actuated valve for controlling flow through said conduit, said valve being constantly subjected to the pressure of the lubricant from said supply means to open said valve, and means for positively moving said valve against the pressure of said lubricant, said last named means being responsive to the conditions in the said power unit.

12. A lubricator comprising a pressure actuated control head, a lubricant regulating head, a chamber in each of said heads, a movable abutment forming one side of the respective chambers, a passageway establishing communication between the chamber in the control head and the exterior face of the abutment of the regulating head, a normally closed valve carried by the abutment of the control chamber for controlling flow through said passageway, an inlet for delivering lubricant to the chamber of the regulating head, an outlet for discharging the lubricant therefrom, a valve carried by the abutment of the regulating head controlling the flow through the said outlet, and means for conducting a pressure actuated fluid to the control head chamber.

13. A lubricator comprising a control head provided with a pressure chamber, a movable abutment forming one wall of said chamber, a lubricant regulating head having a casing, a movable abutment in said casing dividing the same into a leakage chamber and a lubricant receiving chamber disposed at the opposite sides thereof, means adapted to establish communication between said pressure chamber and leakage chamber, said leakage chamber being provided with means permitting gradual escape of fluid therefrom, a valve carried by the pressure chamber abutment controlling flow of fluid through the first named means, an inlet for delivering lubricant to the receiving chamber, an outlet for discharging lubricant therefrom, and a valve carried by the abutment of the lubricant regulating head governing the escape of the lubricant from the lubricant receiving chamber.

14. A lubricator comprising a control head consisting of a casing having an imperforate diaphragm forming the movable wall of a pressure chamber, means for conducting pressure fluid into the said chamber, a fluid conducting passageway leading from said chamber, a valve carried by the diaphragm controlling flow through said passageway and yieldingly urged towards closed condition, a lubricant regulating head consisting of a casing, an imperforate diaphragm in said casing having a venting chamber at one side and a lubricant receiving chamber at the opposite side thereof, the said passageway from the pressure chamber discharging into the venting chamber, the venting chamber being provided with a restricted port permitting escape of fluid therefrom, the lubricant receiving chamber being provided with an inlet and an outlet, a valve carried by the diaphragm of the regulating head controlling flow through the said outlet, and yielding means for urging said valve to its closed condition.

15. A lubricator comprising a control head consisting of a casing having an imperforate diaphragm forming the movable wall of a pressure chamber, means for conducting pressure fluid into the said chamber, a fluid conducting passageway leading from said chamber, a valve carried by the diaphragm controlling flow through said passageway and yieldingly urged towards closed condition, a lubricant regulating head consisting of a casing, an imperforate diaphragm in said casing having a venting chamber at one side and a lubricant receiving chamber at the opposite side thereof, the said passageway from the pressure chamber discharging into the venting chamber, the venting chamber being provided with a restricted port permitting escape of fluid therefrom, the lubricant receiving chamber being provided with an inlet and an outlet, a valve carried by the diaphragm of the regulating head controlling flow through said outlet, a compression spring within the venting chamber for urging the said valve to its closed condition, and an adjustable stop for limiting opening movement of said valve.

In testimony whereof I have hereunto set my hand this 24th day of August A. D. 1925.

FORDYCE B. FARNSWORTH.